United States Patent Office
3,352,709
Patented Nov. 14, 1967

3,352,709
METHOD OF REPELLING WATER FROM
A TRANSPARENT MEMBER
Keith Gunnar, Bellevue, Wash., and Robert S. Hansen, Ames, Iowa, assignors to The Boeing Company, Seattle, Wash., a corporation of Delaware
No Drawing. Filed Jan. 4, 1963, Ser. No. 249,322
8 Claims. (Cl. 117—124)

This invention relates to an improvement in the art of removing a liquid from the surface of a transparent member to improve the visibility therethrough. More particularly this invention relates to improving water repellency effected on donor sites of a surface, including providing certain chemical solute substances and combinations thereof discovered to be superlatively advantageous in effecting a hydrophobic coating.

In the U.S. patent application Ser. No. 214,494, filed Aug. 3, 1962 is described a method of repelling water from a transparent member, relating particularly to the art of removing rain or water spray from glass, such as aircraft or boat windshields, by rendering the glass water-repellent by the use of a particular chemical solution which may be applied upon the glass.

Thus, it is an object of this invention to provide a method of effecting a hydrophobic coating of increased strength and life-time by dissolving together in a solvent a combination of at least two co-acting chemical substances suitable in combination for effecting a hydrophobic coating upon donor sites of a surface of a transparent member when the resulting solution is thereafter applied to said surface.

Another object of this invention is to provide a method for effecting an optically clear coating of a water-repellent substance on a surface of a transparent member by subjecting such surface to impingement of water droplets and a solution including a solvent and a combination of at least two co-acting chemical substances in combination suitable for effecting a hydrophobic coating upon surface donor sites of a transparent member.

And another object of this invention is to provide certain co-acting chemical substances suitable as solutes, at least two of which are soluble and water-repellent together in a solvent, for effecting a hydrophobic coating upon donor sites of a surface of a transparent member.

Still another object of this invention is to provide a means of effecting a hydrophobic coating of increased strength and life-time by dissolving together in a solvent a combination of a quaternary ammonium compound and an amine suitable when dissolved together in a solvent for effecting a hydrophobic coating of increased strength and life-time upon donor sites of a surface of a transparent member.

Yet another object of this invention is to provide a means of effecting a hydrophobic coating of increased strength and life-time by dissolving together in a solvent a combination of a quaternary ammonium compound and a straight long-chain aliphatic alcohol suitable for effecting a hydrophobic coating upon donor sites of a surface of a transparent member when the resulting solution is thereafter applied to said surface.

And yet another object of this invention is to provide a quaternary ammonium compound and a straight long-chain aliphatic alcohol suitable when dissolved together in a solvent for effecting a hydrophobic coating of increased strength and life-time upon donor sites of a surface of a transparent member.

Another object of this invention is to provide for effecting an optically clear coating of a water-repellent substance on a surface of a transparent member by means of subjecting such surface to impingement of water droplets and a solution including a solvent and an amine.

And another object of this invention is to provide an amine suitable as a solute for effecting a hydrophobic coating upon the surface of materials exhibiting surface donor sites.

Still another object of this invention is to provide a solvent suitable for preparing a solution for effecting a hydrophobic coating of increased strength and life-time upon the surface of materials exhibiting surface donor sites.

And still another object of this invention is to provide a solution comprising at least two co-acting water-repellent chemical substances together soluble in a solvent, suitable in combination for effecting a hydrophobic coating upon the surface of materials exhibiting surface donor sites.

Yet another object of this invention is to provide a solution comprising a quaternary ammonium compound and an amine together soluble in a solvent, suitable in combination for effecting a hydrophobic coating upon the surface of materials exhibiting surface donor sites.

And yet another object of this invention is to provide a solution comprising a quaternary ammonium compound and a straight long-chain aliphatic alcohol together soluble in a solvent, suitable in combination for effecting a hydrophobic coating upon the surface of materials exhibiting surface donor sites.

Another object of this invention is to provide a solution of an amine and a solvent suitable for effecting a hydrophobic coating upon the surface of materials exhibiting surface donor sites.

And another object of this invention is to provide a means of effecting a hydrophobic coating of controlled molecular thickness upon the surface of a transparent member.

Still another object of this invention is to provide a method of sustaining optically visible water repellency of a hydrophobic coating effected upon donor sites of a surface by means of continually seeping upon said surface a solution of the same water-repellent substance or substances used in effecting an initial water repellent coating, regulating such seepage to issue a small quantity of repellent solution upon said donor sites of said surface for a given period of time.

Other objects and advantages will become apparent from the following description.

It has been found that cationic surface active agents or detergents, such as the quaternary ammonium compound type described herein, when adsorbed on donor surface sites are very likely to form layers in which the spacings of the hydrophobic hydrocarbon tails is rather larger (about 32 square angstroms per tail) than a close-packed configuration (which would allow about 21 square angstroms per tail) because the hydrophilic portions of the molecule have larger cross sections than the hydrophobic tails. A completely close-packed structure is not necessary for repellency. Studies of the wetting of depleted monolayers of water repellents indicate that there is no substantial reduction of contact angle until the monolayer is about 60% depleted. It is believed that monolayers formed by cationic detergents, such as the quaternary ammonium compound type described herein, resemble close-packed monolayers which have been about 33% depleted. Such monolayers, however, may be more subject to further depletion than close-packed monolayers, because the adhesion of close-packed hydrocarbon tails contributes importantly to the strength of the film. The molecules of cationic surface active agents also may be more subject to disorientation, and the disorientation may also reduce the water-repellency.

The problem of close-packing the molecules of a hydrophobic coating upon surface donor sites is overcome by this invention, with the result that stronger and longer lasting water repellency is thereby achieved. A second type of surface active material with a long organic chain but with a hydrophilic head smaller in cross-section than the hydrophobic carbon chain is used, so that the small hydrophilic head of the second substance can fill—of pack—in the vacancies left by the loosely packed primary cationic agent as used alone in the prior art.

A combination of at least two co-acting substances suitable as solutes for effecting a hydrophobic coating upon donor surface sites has been discovered to be one chemical substance selected from each of the following two groups, labeled Group A and Group B.

GROUP A

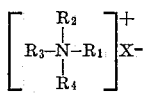

wherein $R_1$ represents an aliphatic radical of from 12 to 22 carbon atoms, inclusive; $R_2$ represents a radical of the class consisting of methyl and aliphatic radicals, the latter comprising 12 to 22 carbon atoms, inclusive; $R_3$ represents a radical of the class consisting of methyl and

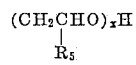

radicals; $R_4$ represents a radical of the class consisting of methyl and

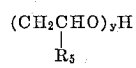

radicals; $x$ and $y$ each represents a certain number the sum of which is 2 to 15, inclusive; $R_5$ represents a radical consisting of the class of H and methyl radicals; X represents an anion.

GROUP B

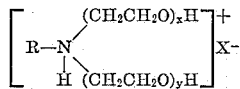

wherein R represents a radical selected from the group consisting of an aliphatic radical of from 8 to 22 carbon atoms, inclusive, or a mixture of aliphatic radicals of from 8 to 22 carbon atoms, inclusive; $x$ and $y$ each represents a certain number the sum of which is 0 to 50, inclusive; X represents an anion, such as hydroxide, chloride, acetate, and the like.

The configuration of the Markush for the amines above can also be shown as follows:

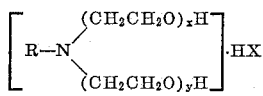

wherein R represents a radical selected from the group consisting of an aliphatic radical of from 8 to 22 carbon atoms, inclusive, or a mixture of aliphatic radicals of from 8 to 22 carbon atoms, inclusive; $x$ and $y$ each represents a certain number the sum of which is 0 to 50, inclusive; HX represents water, or an acid, such as hydrochloric acid or acetic acid, and the like.

General test conditions under which the exemplary data set forth in this application was obtained include the use of a Boeing 707/720 cabin mock-up and a blower. A production Boeing 707 No. 1 windshield was installed on the captain's side of the mock-up with window electrical heat (conductive film system) activated and used during all testing. A production Boeing 707/720 windshield wiper system was installed with a wiper blade pressure of nine pounds. An in-flight repellent nozzle was located in a position that would give a complete coverage of the windshield when the repellent was applied. A series of 0.024 inch inside diameter rain nozzles were installed at the blower exit to simulate rain, with the rain intensity being controlled by the number of rain nozzles in use. An electrical control system was used to supply the repellent onto the test windshield. The electrical system was calibrated to allow 5 milliliters of water-repellent solution to flow through the delivery nozzle each time the system was activated, and each actuation was automatically counted on an electrical counter. The windshield and repellent system were cleaned prior to the start of each run so that the repellent tested would not be contaminated by the residue of the previous test solution. When it was determined that the windshield was completely wettable a new test solution was placed in the repellent reservoir and the electrical system activated. The blower was started and set at a speed of about 3000 r.p.m. which produced a velocity of approximately 90 knots at the windshield. The rain intensity was then set at about 1.6 inches per hour. Each repellent was tested for about five minutes without windshield wipers and about five minutes with windshield wipers, noting the number of applications required and the time interval between squirts during which time the test windshield remained visibly water repellent.

*Example 1*

A solution was prepared comprising 5 grams of polyoxyethylene stearyl methyl ammonium chloride, a quaternary ammonium compound selected from Group A above, and 2.5 grams of "coco" polyoxyethylene (5) amine, an amine selected from Group B above, dissolved together in 92.5 grams of 99% isopropyl alcohol. The average time elapsing between applications during which time the windshield appeared visibly water repellent without the use of windshield wipers was 42 seconds. With windshield wipers the average time lapse was 53 seconds.

*Example 2*

A solution was prepared comprising 3.75 grams of dimethyl di-"coco" ammonium chloride, a quaternary ammonium compound selected from Group A above, and 2.5 grams of "coco" polyoxyethylene (2) amine, an amine selected from Group B above dissolved together in 93.75 grams of a solvent comprising 92.53 grams of trichloromonofluoromethane, 0.38 gram of water and 0.84 gram of isopropyl alcohol. The average time elapsing between applications during which time the windshield appeared visibly water repellent without the use of windshield wipers was 37 seconds. With windshield wipers the average time lapse was 51 seconds.

*Example 3*

A solution was prepared comprising 5 grams of dimethyl di - "coco" ammonium chloride, a quaternary ammonium compound selected from Group A above, and 2.5 grams of octadecylpolyoxyethylene (50) amine, an amine selected from Group B above, dissolved together in a solvent comprising 2.3 grams of water and 90.2 grams of isopropyl alcohol. It was found that without the windshield wipers in operation the average time elapsing during which time the windshield remained visibly water repellent was 37 seconds.

*Example 4*

A solution was prepared comprising 5 grams of dimethyl di - "coco" ammonium chloride, a quaternary ammonium compound selected from the Group A above, and 2.5 grams of octadecylpolyoxyethylene (2) amine, an amine selected from Group B above, dissolved together in a solvent comprising 2.3 grams of water and 90.2 grams of isopropyl alcohol. It was found that without the windshield wipers in operation the average time elapsing during which time the windshield remained visibly water repellent was 57 seconds. With the windshield wipers in operation the average time lapse was 154 seconds.

*Example 5*

A solution was prepared comprising 5 grams of polyoxyethylene stearyl methyl ammonium chloride, a quaternary ammonium compound selected from Group A above, and 1 gram of hexadecyl amine, an amine selected from Group B above, dissolved together in 94 grams of 99% isopropyl alcohol. It was found that without the windshield wipers in operation the average time elapsing during which time the windshield remained visibly water repellent was 53 seconds. With the windshield wipers in operation the average time lapse was 83 seconds.

The total concentration of at least two co-acting chemical solute substances, one each of which is selected from Groups A and B above and suitable as solutes for this invention, should be such that the total weight of the solutes in grams to the weight of the water-repellent solution in grams does not exceed 30 to 100.

Certain long-chain aliphatic alcohols have also been discovered to be suitable as co-acting surface active agents.

A combination of at least two co-acting substances suitable as solutes for effecting a hydrophobic coating upon donor surface sites has been discovered to be one chemical substance selected from each of the following two groups, labeled Group C and Group D.

GROUP C

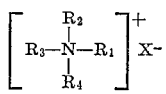

wherein $R_1$ represents an aliphatic radical of from 12 to 22 carbon atoms, inclusive; $R_2$ represents a radical of the class consisting of methyl and aliphatic radicals, the latter comprising 12 to 22 carbon atoms, inclusive; $R_3$ represents a radical of the class consisting of methyl and

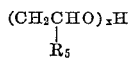

radicals; $R_4$ represents a radical of the class consisting of methyl and

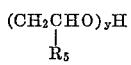

radicals; $x$ and $y$ each represents a certain number the sum of which is 2 to 15, inclusive; $R_5$ represents a radical consisting of the class of H and methyl radicals; X represents an anion.

GROUP D

A straight long-chain aliphatic or synthetic alcohol comprising 12 to 16 carbon atoms, inclusive, such as dodecanol, tridecanol, tetradecanol, pentadecanol, hexadecanol, and the like.

*Example 6*

A solution was prepared comprising 5 grams of hexadecyl trimethyl ammonium bromide, a quaternary ammonium compound selected from Group C above, and 2.5 grams of hexadecanol, a straight, long-chain aliphatic alcohol selected from Group D above, dissolved together in 92.5 grams of 99% isopropyl alcohol. The average time elapsing between applications during which time the windshield appeared visibly water repellent without the use of windshield wipers was 34 seconds. With windshield wipers the time lapse was 34 seconds.

The total concentration of a combination of a water-repellent substance selected from Group C above and a supplementary surface-active long-chain aliphatic or synthetic alcohol selected from Group D above for this invention should be such that the total weight of the chemical solute substances (at least one each from said Groups C and D) in grams to the weight of the water-repellent solution in grams does not exceed thirty to one hundred.

In accordance with this invention, the amines selected from Group B above have been discovered to be suitable as singular solutes for preparing a solution for effecting a hydrophobic coating upon donor surface sites of a transparent member.

*Example 7*

6 grams of "coco" polyoxyethylene (5) amine were dissolved in 94 grams of 99% isopropyl alcohol. It was found that without the windshield wipers in operation the average time elapsing between applications during which time the windshield remained visibly water repellent was 27 seconds. With the windshield wipers in operation the average time lapse was 51 seconds.

*Example 8*

5 grams of "coco" polyoxyethylene (2) amine were dissolved in 95 grams of 99% isopropyl alcohol. It was found that without the windshield wipers in operation the average time elapsing between applications during which time the windshield remained visibly water repellent was 32 seconds. With the windshield wipers in operation the average time lapse was 48 seconds.

*Example 9*

2.7 grams of octadecylpolyoxyethylene (2) amine were dissolved in 97.3 grams of 99% isopropyl alcohol. It was found that without the windshield wipers in operation the average time elapsing during which time the windshield remained visibly water repellent was 29 seconds. With the windshield wipers in operation the average time lapse was 37 seconds.

*Example 10*

2.9 grams of hexadecyl amine were dissolved in 97.1 grams of 99% isopropyl alcohol. It was found that without the windshield wipers in operation the average time elapsing between applications during which time the windshield remained visibly water repellent was 59 seconds. With the windshield wipers in operation the average time lapse was 160 seconds.

The general test conditions for each of the following examples remains the same as for the preceding examples, with the exception that the rain intensity for each of the following examples was set at about 1.4 inches per hour.

*Example 11*

5 grams of dimethyl di-"cico" ammonium chloride were dissolved in 95 grams of 99% isopropyl alcohol. It was found that without the windshield wipers in operation the average time elapsing between applications during which time the windshield remained visibly water repellent was 70 seconds. With the windshield wipers in operation the average time lapse was 149 seconds.

*Example 12*

2.3 grams of dodecyl amine were dissolved in 97.7 grams of 99% isopropyl alcohol. It was found that without the windshield wipers in operation the average time elapsing between applications during which time the windshield remained visibly water repellent was 18 seconds. With the windshield wipers in operation the average time lapse was 26 seconds.

*Example 13*

5 grams of dimethyl di-"coco" ammonium chloride and 2.5 grams of dodecyl amine were dissolved in 92.5 grams of 99% isopropyl alcohol. It was found that without the windshield wipers in operation the average time elapsing between applications during which time the windshield remained visibly water repellent was 56 seconds. With the windshield wipers in operation the average time lapse was 355 seconds.

*Example 14*

1.6 grams of octylamine were dissolved in 98.4 grams of 99% isopropyl alcohol. It was found that without the windshield wipers in operation the average time elapsing between applications during which time the windshield remained visibly water repellent was 19 seconds. With the windshield wipers in operation the average time lapse was 17 seconds.

The concentration of an amine, as a suitable solute for this invention, should be such that the weight of the amine in grams to the weight of the water-repellent solution in grams does not exceed twenty to one hundred.

The dramatic effectiveness of the water repellents and water-repellent combinations as indicated in the foregoing examples was substantiated in actual in-flight tests using Boeing 707 aircraft. Good water repellency was obtained and maintained even upon aircraft windshields which were naturally contaminated with air-borne dust and oil. Repellency was effective in various rain intensities and air speeds.

It is emphasized that the quantity of each chemical substance indicated in the foregoing examples, particularly the solutes therein, is that quantity of the commercial product—usually marketed under a corresponding trade name—discovered to be suitable for this invention. The aliphatic radicals referred to in this application comprise carbon chains in which the even-numbered carbon chains, e.g., dodecyl, tetradecyl, hexadecyl, octadecyl, etc. are derived from natural-occurring fats; while the odd-numbered carbon chains, e.g., tridecyl, pentadecyl, etc., are derived from synthetic sources. The term "coco" as referred to herein indicates a derivation from the natural-occurring fatty acids of the coconut. The term "tallow" indicates that tallow is the source of the natural-occurring fatty acids.

The use in the present specifications and claims of the word: "polyoxyalkylene" is intended to be the full equivalent of polyoxypolyalkylene.

For this invention, co-acting chemical substances are defined as those chemical substances which are synergistic in promoting a hydrophobic character for a surface when adsorbed together in a surface film on said surface.

The isopropyl alcohol referred to in this application is 99% pure, unless otherwise stated.

For this invention, a donor site is defined as a site on a surface, such as on a glass surface, said site being a position available for acceptance of a water-repellent substance, especially such as an anionic charge site, and also such as a hydrogen bond site or an acidic site.

Solvents discovered particularly suitable for this invention include water; isopropyl alcohol; trichloro, monofluoromethane; 1,1,2-trichloro, 1,2,2-trifluoroethane; 2 butoxyethanol; a combination of one of the foregoing with water and/or isopropyl alcohol; a combination of isopropyl alcohol and 1,1,2-trichloro, 1,2,2-trifluoroethane; a combination of isopropyl alcohol and 1,1,2-trichloro, 1,2,2-trifluoroethane and 1,1,2-tetrachloro, 1,2-difluoroethane; a combination of ethylene glycol and water; and the like.

Test results indicate that there is very little variation in the strength and life-time of water repellent coatings when different solvents are used for this invention. For example, in separate tests experimental results were about the same when 3.75 grams of dimethyl di-"coco" ammonium chloride and 2.5 grams of "coco" polyoxyethylene (2) amine were dissolved together in 93.75 grams of one of the following solvents or combinations of solvents: isopropyl alcohol; a combination of 91.5 grams of 1,1,2-trichloro, 1,2,2-trifluoroethane and 2.25 grams of 2 butoxyethanol; ethylene glycol; water; a combination of 12,19 grams of isopropyl alcohol and 81.56 grams of 1,1,2-trichloro, 1,2,2-trifluoroethane.

Ethylene glycol, besides being a suitable solvent for this invention, has the useful property of lubricating the contact points between the windshield wipers and the surface of the windshield.

An improvement in applying solutions of water repellents comprises the use of a system in which an initial application of the water-repellent solution is made to the receiving surface, thereafter a small and continual quantity of the said water-repellent solution is "bled" or seeped through the windshield wiper or through a nozzle or other apparatus upon the windshield for a given period of time.

For rapidly effecting a hydrophobic coating initially upon the surface of a transparent member, an initial application of about 5 milliliters of the water-repellent solution is preferred. Using this improved system and the water-repellent substances and combinations taught in this application it has been found that water repellency can be maintained for an average time of about 35 minutes outside the windshield wiper area, and continuously within the windshield wiper area.

It is emphasized that simultaneous impingement of water droplets on the receiving surface is not necessary for effecting the hydrophobic coating. Such a coating will develop from an applied water-repellent solution referred to herein without simultaneous impingement of water droplets on the receiving surface. Further, if the said water-repellent solution is sufficiently dilute, which is difficult to control, the hydrophobic coating effected will be ultra-thin and water-repellent without washing or impingement with water. What is critical is that such a hydrophobic coating is formed even while water droplets are simultaneously impinging during the process, and that the water droplets, whether or not simultaneously applied, have indeed a beneficial effect in washing off excessive molecular layers of the water-repellent substance which may form by virtue of high solution concentration and which would otherwise tend to destroy the water repellency.

There are indications that on dry glass (glass the surface of which is devoid of water in either liquid or vapor form) the ionic charge on the surface is probably random, being perhaps anionic and cationic at certain sites. In the absence of optically visible water, the charge on a glass surface probably depends upon electrostatic forces or upon atmospherically adsorbed moisture. When water reaches a glass surface, either as a liquid or as atmospheric moisture, the surface charge apparently becomes anionic due to water adsorption and hydrolysis to form —OH groups on the surface. This theory explains the particular usefulness of this invention in the presence of rain.

From the above description it can be seen that in accordance with the teachings of this invention there is provided a method of effecting an improved hydrophobic coating to such surfaces as windshields of vehicles while in motion, including, but not limited to, air-borne vehicles. Other vehicles upon which this invention may be advantageously practiced include high speed boats, for the removal of rain and water spray; and re-entry vehicles, in which, because of power limitations, this invention would be especially valuable. Thus, certain water-repellent substances may be used while in flight or in motion, and used repetitiously as the need arises. Therefore, the disadvantage of pre-applied hydrophobic coatings which may be eroded away in flight or in motion by rain, hail, sleet, or ice crystals, or dust, sand or air is overcome by this invention.

It is to be understood that the above description is for the purpose of illustration and not by way of limitation and that changes and modifications may be made therein without departing from the spirit and scope of the invention.

Having thus described our invention, what we desired to protect by Letters Patent is:

We claim:

1. A method of effecting a hydrophobic coating of increased strength and life-time upon the surface of a transparent member, comprising:

(a) preparing a water-repellent solution by dissolving together in a suitable solvent a combination of the following two co-acting water-repellent chemical solutes:

(1) a solute represented generally as Group A:

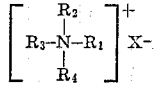

wherein $R_1$ represents an aliphatic radical of from 12 to 22 carbon atoms, inclusive; $R_2$ represents a radical of the class consisting of methyl and aliphatic radicals, the latter comprising 12 to 22 carbon atoms, inclusive; $R_3$ represents a radical of the class consisting of methyl and

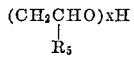

radicals; $R_4$ represents a radical of the class consisting of methyl and

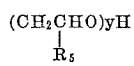

radicals; $x$ and $y$ each represents a certain number the sum of which is 2 to 15, inclusive; $R_5$ represents a radical consisting of the class of H and methyl radicals; X represents an anion;

(2) a solute represented generally as Group B:

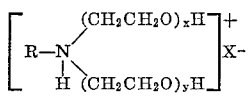

wherein R represents a radical selected from the group consisting of an aliphatic radical of from 8 to 22 carbon atoms, inclusive; and a mixture of aliphatic radicals of from 8 to 22 carbon atoms, inclusive; $x$ and $y$ each represents a certain number the sum of which is 0 to 50, inclusive; X represents an anion; and, (b) applying the water-repellent solution upon the surface of the transparent member.

2. A method of effecting a hydrophobic coating of increased strength and life-time upon the surface of a transparent member, comprising:

(a) preparing a water-repellent solution by dissolving together in a suitable solvent a combination of the following two co-acting chemical solutes:

(1) a solute represented generally as Group C:

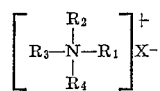

wherein $R_1$ represents an aliphatic radical of from 12 to 22 carbon atoms, inclusive; $R_2$ represents a radical of the class consisting of methyl and aliphatic radicals, the latter comprising 12 to 22 carbon atoms, inclusive: $R_3$ represents a radical of the class consisting of methyl and

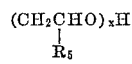

radicals; $R_4$ represents a radical of the class consisting of methyl and

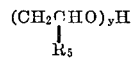

radicals; $x$ and $y$ each represent a certain number the sum of which is 2 to 15, inclusive; $R_5$ represents a radical consisting of the class of H and methyl radicals; X represents an anion;

(2) a solute represented generally as Group (D), viz., a straight long-chain aliphatic alcohol comprising 12 to 16 carbon atoms, inclusive; and (b) applying the water-repellent solution upon the surface of the transparent member, during the simultaneous impingement thereon of water.

3. The method of claim 1 wherein $R_3$ is the radical $(CH_2CH_2O)_xH$ and $R_4$ is the radical $(CH_2CH_2O)_yH$.

4. The method of claim 1 wherein the Group A solute is selected from the group consisting of polyoxyethylene stearyl methyl ammonium chloride, dimethyl di-"coco" ammonium chloride and hexadecyl trimethyl ammonium bromide.

5. A method of effecting a hydrophobic coating of increased strength and life-time upon the surface of a transparent member, comprising:

(a) dissolving dimethyl di-"coco" ammonium chloride and "coco" polyoxyethylene (2) amine in a solvent comprising trichloromonofluoromethane, water and isopropyl alcohol, to thereby form a hydrophobic coating solution; and (b) applying to the surface of a transparent member a small quantity of the hydrophobic solution during the simultaneous impingement thereon of water droplets.

6. The method of claim 2 wherein $R_2$, $R_3$ and $R_4$ are methyl radicals.

7. The method of claim 6 wherein the Group C solute is hexadecyl trimethyl ammonium bromide.

8. A method of effecting a hydrophobic coating of increased strength and life-time upon the surface of a transparent member, comprising:

(a) dissolving hexadecyl trimethylammonium bromide and hexadecanol in a solvent comprising isopropyl alcohol; and (b) applying to the surface of a transparent member a small quantity of the hydrophobic solution during the simultaneous impingement thereon of water droplets.

References Cited

UNITED STATES PATENTS

| | | | |
|---|---|---|---|
| 1,502,821 | 7/1924 | Harrington | 239—284 |
| 2,314,111 | 3/1943 | Tucker et al. | 260—567.6 |
| 2,356,542 | 8/1944 | Sloan | 117—124 |
| 2,982,672 | 5/1961 | Santelli | 117—124 |
| 3,048,265 | 8/1962 | Hackhel et al. | 106—13 |
| 3,123,641 | 3/1964 | Longley | 260—567.6 |
| 3,147,065 | 9/1964 | Koshar et al. | 260—567.6 |

ALFRED L. LEAVITT, *Primary Examiner.*

A. H. ROSENSTEIN, *Assistant Examiner.*